United States Patent
Goolsby (10) Patent No.: US 6,270,225 B1
(45) Date of Patent: Aug. 7, 2001

(54) BLIND SPOT SIDEVIEW MIRRORS

(76) Inventor: Roger J Goolsby, 211 Orchard Rd., Rex, GA (US) 30273

( * ) Notice: Subject to any disclaimer, the term of this patent is extended or adjusted under 35 U.S.C. 154(b) by 0 days.

(21) Appl. No.: 09/347,647

(22) Filed: Jul. 6, 1999

Related U.S. Application Data (60) Provisional application No. 60/092,011, filed on Jul. 8, 1998.

(51) Int. Cl.[7] ..................................................... G02B 5/08
(52) U.S. Cl. ......................... 359/866; 359/868; 359/869; 359/870
(58) Field of Search ..................................... 359/866, 868, 359/869, 870, 850

(56) References Cited

U.S. PATENT DOCUMENTS

| | | | |
|---|---|---|---|
| 4,306,770 | * 12/1981 | Marhauser | 389/866 |
| 4,643,544 | * 2/1987 | Loughran | 359/866 |
| 4,674,850 | * 6/1987 | Blom | 359/866 |
| 5,616,424 | * 4/1997 | Carey, II et al. | 428/647 |
| 5,793,542 | * 8/1998 | Kondo et al. | 359/864 |

FOREIGN PATENT DOCUMENTS

| | | | |
|---|---|---|---|
| 0435793 | * 7/1991 | (EP) | 359/866 |

* cited by examiner

Primary Examiner—Mohammad Sikder (57) ABSTRACT

A left hand and right hand sideview mirror system for vehicles to provide an adequate display of vehicles in the regular view area, the overtaking area, and the blind spot area in one single contiguous mirror. This is all done with three flat plane mirror sections with different degree planes connected with multiple narrow flat plane transition sections with degree changes of ½ to 1 degree each to avoid noticeable view gaps and distortion. This produces a large mirror display area and positioned so that the driver instantly understands the situation in the entire area behind his frontal view including the blind spot area along with overtaking vehicles and the regular viewing area. The driver can then make instant accurate judgmental decisions about making a lane change or moving into a lane thus avoiding the danger caused by overlooking the vehicles in the danger area which did not show up in prior sideview mirrors or showed up in a distorted misleading or confusing manner.

1 Claim, 7 Drawing Sheets

MIRROR PLANES
FIG. 2A

FIG. 3B

MIRROR PLANES
FIG. 3A

MOLD FOR MIRROR ANGLE CHANGE
FROM 0 DEGREES TO 2.2 DEGREES

FIG. 6B

MOLD FOR MIRROR ANGLE CHANGE
FROM 0 DEGREES TO 2.4 DEGREES

NOT TO SCALE

BLIND SPOT SIDEVIEW MIRRORS

This Appln claims the benefit of Provisional No. 60/092,011 filed Jul. 8, 1998.

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to the blind spot and overtaking vehicles entering the blind spot area on each side of a vehicle in which the driver can not see vehicles in the blind spot area or vehicles about to enter the blind spot area in a single flat plane sideview mirror thus causing some vehicle accidents and "Road Rage" incidents for which our invention solves the problem while other inventors have tried but all have failed. The convex right hand sideview mirror currently required on new cars increases the danger problem because it makes overtaking and blind spot vehicles incorrectly appear to be 100 feet or more behind the driver which worsens the danger then causes even more accidents plus created the term "Road Rage".

This invention specifically eliminates the dangerous distortion caused by the right hand convex mirror currently required by the U.S. Department of Transportation. The current right hand convex mirror is a major cause of accidents, near accidents, and "Road Rage" incidents when many people switch to the right hand lane thinking the vehicle in the right hand mirror is far behind when in fact it is in the blind spot or overtaking area. Thus "cutting off" the driver in the "blind spot", or overtaking area, which then provokes a hot tempered idiot "blind spot" driver into a "road rage" incident and sometimes shooting at the other driver. This invention also eliminates the left hand lane changing hazard caused by the current single flat plane sideview mirror by displaying vehicles without distortion in all three danger areas.

Distortion would be caused by prior sideview mirror inventions using convex or concave mirrors, rounded angles, wide dividers between viewing flat planes, viewing area too small, inadequate angles, no provision for overtaking vehicle danger, or located on or about the regular flat plane mirror in a confusing manner. All previous inventions would require mental interpretation to provide necessary information to the driver which in turn would worsen the blind spot and overtaking problem and would then become a hazard while attempting to provide a safety device.

Some additional prior art that has failed to provide a viable solution to the blind spot and overtaking problem with convex and concave mirrors, U.S. patent numbers are: U.S. Pat. Nos. 3,337,285: 3,389,952; 4,306,770; 4,331,382; EP-435-792-A, 5,793,542

All of the above produce distortion and misleading information to the driver which in turn is more dangerous than a single flat plane sideview mirror.

Some prior art that has failed to provide a viable solution to the blind spot and overtaking problem with flat plane sideview mirror sections, U.S. patent numbers are: U.S. Pat. Nos. 2,279,751; 3,628,851; 3,826,563; 3,797,920; 4,182,552; 4,859,046

None of the above flat plane mirrors provide a viable solution to the blind spot due to wide dividers, peculiar positions, etc. None of them even attempts to provide a solution to the overtaking problem and generally all of them appear to ignore the right hand sideview mirror problem. The right hand sideview mirror requires a different design from the left hand sideview mirror.

Inside mirrors with different angles, convex, concave, or flat plane sections can not provide the solution to the blind spot or overtaking problem because, aside from other deficiencies, passengers and post supporting the roof obstruct the driver's view through the interior rearview mirror and would increase the danger if a driver depends on them for lane changing decisions.

This inventor examined more than 60 U.S. patents regarding vehicle mirrors and none of them provided a viable solution to the blind spot and overtaking vehicle danger problem.

BRIEF SUMMARY OF THIS INVENTION

The object of this invention is to display the regular view of vehicles behind the driver's vehicle along with the display of vehicles in the adjacent lanes on both sides in the blind spot area and overtaking vehicles to the rear of and adjacent to the blind spot area while entering the blind spot area. This is done with a left hand and right hand sideview mirror using an adequate viewing image positioned for relativity, and without distortion using three wide flat plane mirror surfaces at appropriate angles for each of the three sections. Each wide mirror section is connected using narrow flat plane transition mirrors with plane angle changes of ½ to 1 degree to eliminate noticeable view gaps and prevent distortion. This transition system is similar to the rapid "still pictures" in movies that appear to be moving in which the naked eye does not notice the gap between the rapid still pictures.

This invention is directed toward three viewing areas of flat plane mirrors of adequate size at appropriate angles without any distorted portions in a relative position so that a driver does not have to interpret what he sees in the mirror viewing areas. The view of this sideview mirror invention will be very clear without any need for interpretation or special thought process which will render the correct decision much faster and much safer.

As detailed on the drawings for the left hand and right hand sideview mirrors, the nearest section, A and D, has an image of vehicles a hundred or so feet to the rear of the driver. The second section, B and E with an optional slight reddish tint, has an image of vacant paving or roadside or whatever is in the area just behind the blind spot area, or a vehicle entering the blind spot area if a vehicle is overtaking the driver. The third section, C and F with an optional slight reddish tint, will be showing the rapidly passing landscape alongside the road unless there is a vehicle in the blind spot area then at such time will show a vehicle in the blind spot. The same type view occurs on both sides of the driver's vehicle for a lane on either side.

The proper use of this invention would be, at such time as a driver may wish to change lanes on a multi-lane road, to instantly notify the driver at a glance that a vehicle is in the area to the rear of and adjacent to the blind spot area or is either entering the blind spot as an overtaking vehicle, or that a vehicle is maintaining the same speed as the driver and positioned in the blind spot. This invention would save many lives if provided on all vehicles.

It is also noted that none of the researched prior inventions are being included on new vehicles, except the dangerous accident causing right hand convex distortion sideview mirror, currently and mistakenly required by the U.S. Department of Transportation. The current convex mirror causes Car 1 in FIG. 8 to appear almost as far back as Car 3, which causes many accidents

BRIEF DESCRIPTION OF THE SEVERAL VIEWS OF THE INVENTION

NOTE: Each transition plate detailed in FIGS. 4, 5, 6A, and 6B will be precision ground to exactly the degree needed to avoid not iceable view gaps, which should range from 1 degree down to ½ degree. The number of flat narrow plates will vary according to the degree or fractions thereof as needed to avoid noticeable view gaps FIG. 4, for the left hand sideview mirror, is a detail of the transition bending plates that will be used in the glass mold to produce the narrow flat plane bending planes transition from mirror plane B to mirror plane C. The total transition is from 2.2 degrees to 10.5 degrees for the left hand sideview mirror. The span of the transition plates should remain approximately 7/32".

DETAILED DESCRIPTION OF THE INVENTION

This invention is the shape and use of the sideview mirrors only and does not include inventing any materials used in this invention. All of the materials that will be used in this invention have already been invented and are available for use in this invention.

A mold for each mirror will be prepared according to FIG. 2A through 6B in which the glass for the mirrors will be heated to a liquid viscosity and poured into the mold which will shape the mirror glass exactly according to the details. The reflective material will be applied to the back of the mirror glass that has been shaped according to the details. The mirrors will be attached to the base and installed in the mounting containers similar to sideview mirrors already being used.

This invention will provide a clear viable view of vehicles in the regular area, the overtaking area and the blind spot area without distortion. Vehicles in the overtaking area, B and E, will appear larger than vehicles in the regular area, A and D, and vehicles will appear much larger in the blind spot area, C and F.

Some prior sideview mirror inventions used convex or concave mirrors that caused misleading distortion. Some used flat plane mirrors but used confusing positioning or disruptive dividers which caused confusion, etc., and did not provide a viable result. Virtually no effort was made to display vehicles in the overtaking area. The right hand sideview convex mirror currently required on new autos by the U.S. Department of Transportation has increased the danger and has apparently created the "Road Rage" incidents as well as caused more accidents than the prior flat plane sideview mirror.

Figure 1:
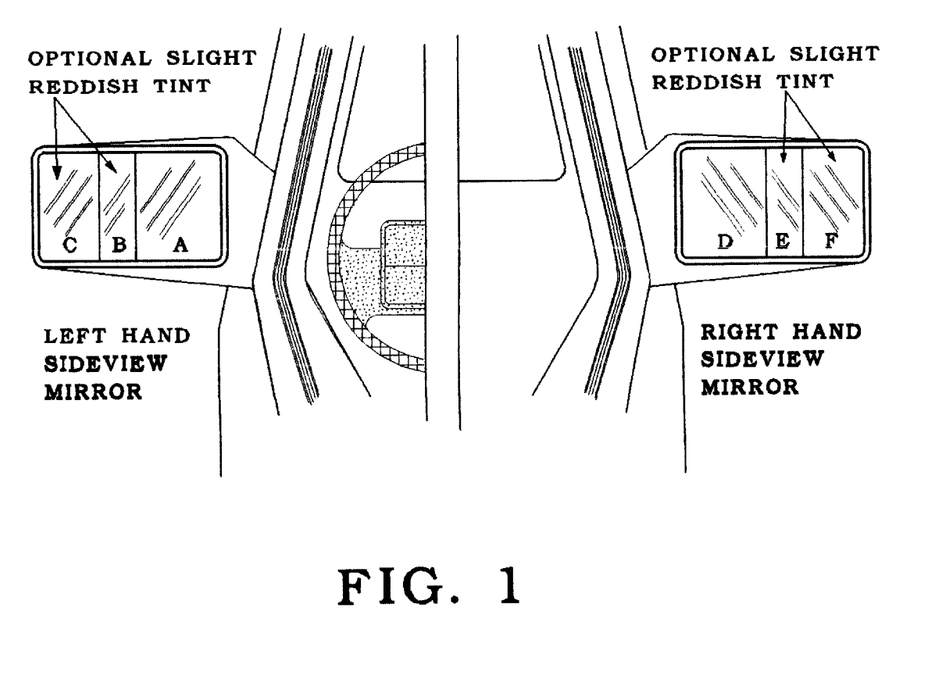
FIG. 1 is a cutaway view of both of the sideview mirrors mounted on a vehicle which shows how they would appear after installation. The letters identifying each section will not be present.

FIG. 1 shows how the mirrors will appear when mounted on vehicles. The drawing shows mounting containers which will be furnished by the manufacturer. With minor modifications the mirrors will fit into mounting containers already being manufactured by most companies that would manufacture this invention.

Figure 2A:
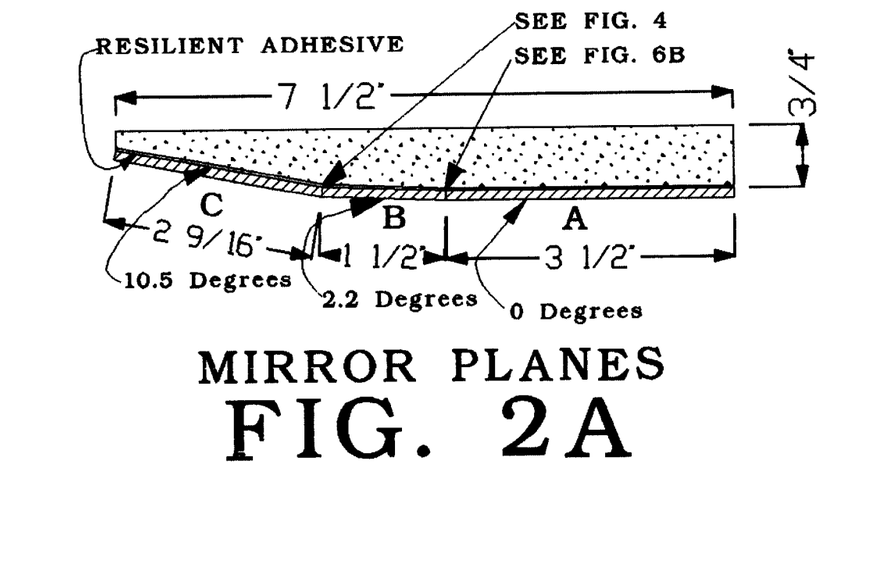
FIG. 2A is a view of the cutaway section of the left hand sideview mirror which shows the angle and approximate width of each of the three sections of the mirror.
Figure 3A:
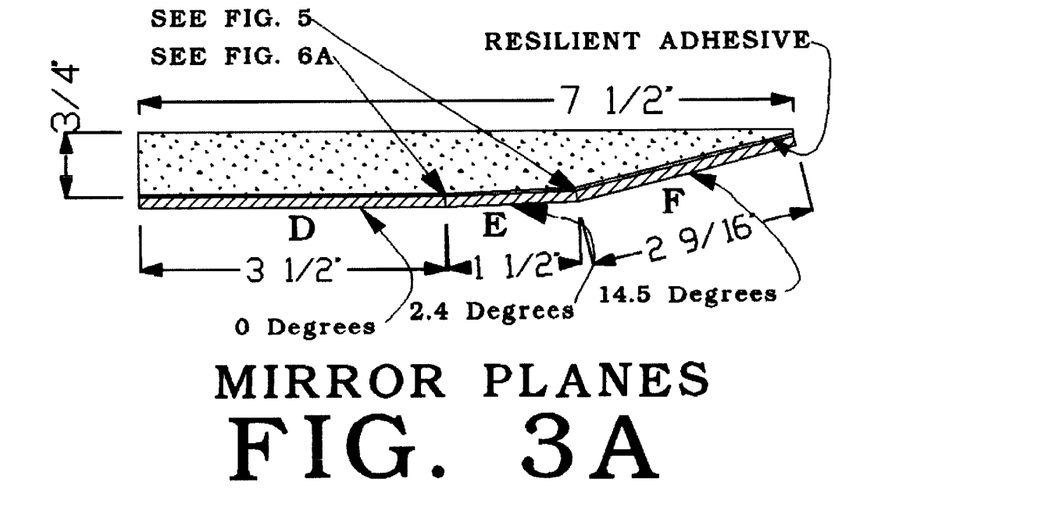
FIG. 3A is a view of the cutaway section of the right hand sideview mirror which shows the angle and approximate width of each of the three sections of the mirror.

FIG. 2A and FIG. 3A details the width and angles for each mirror plan section. It shows how the mirror sections relate to each other and how each will be attached to the base. It shows the angle for each mirror section which is different for the left hand and the right hand mirror. FIG. 2A provides details for the left hand mirror. FIG. 3A provides details for the right hand mirror. The base will be a material which will not swell or shrink due to temperature changes nor moisture changes. The mirror will be attached to the base with resilient adhesive to prevent breakage if the base should change size or shape. The glass in Sections B, C, E, and F may have a slight reddish tint.

Figure 2B:
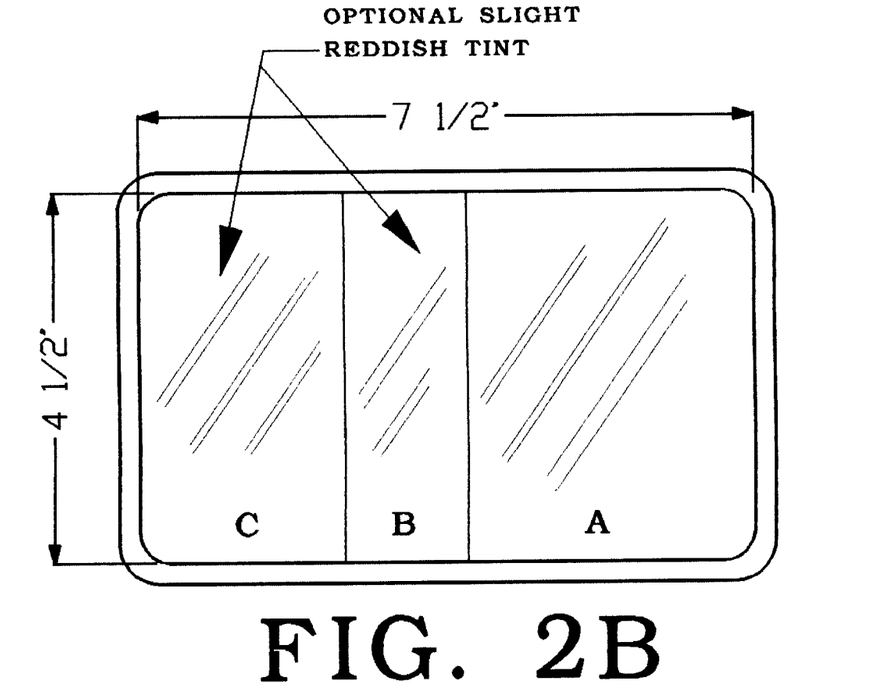
FIG. 2B is a view of the elevation of the left hand sideview mirror which shows the position of the three sections of the mirror, along with the optional reddish tint in Sections B and C.
Figure 3B:
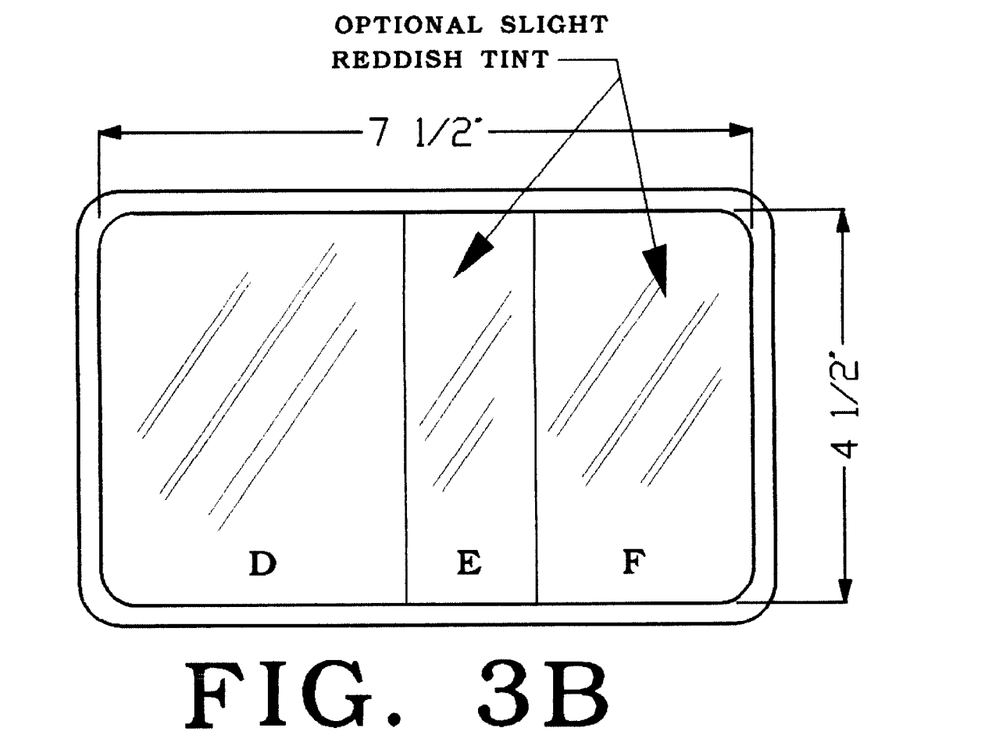
FIG. 3B is a view of the elevation of the right hand sideview mirror which shows the position of the three sections of the mirror, along with the optional reddish tint glass in Sections E and F.
Figure 4:
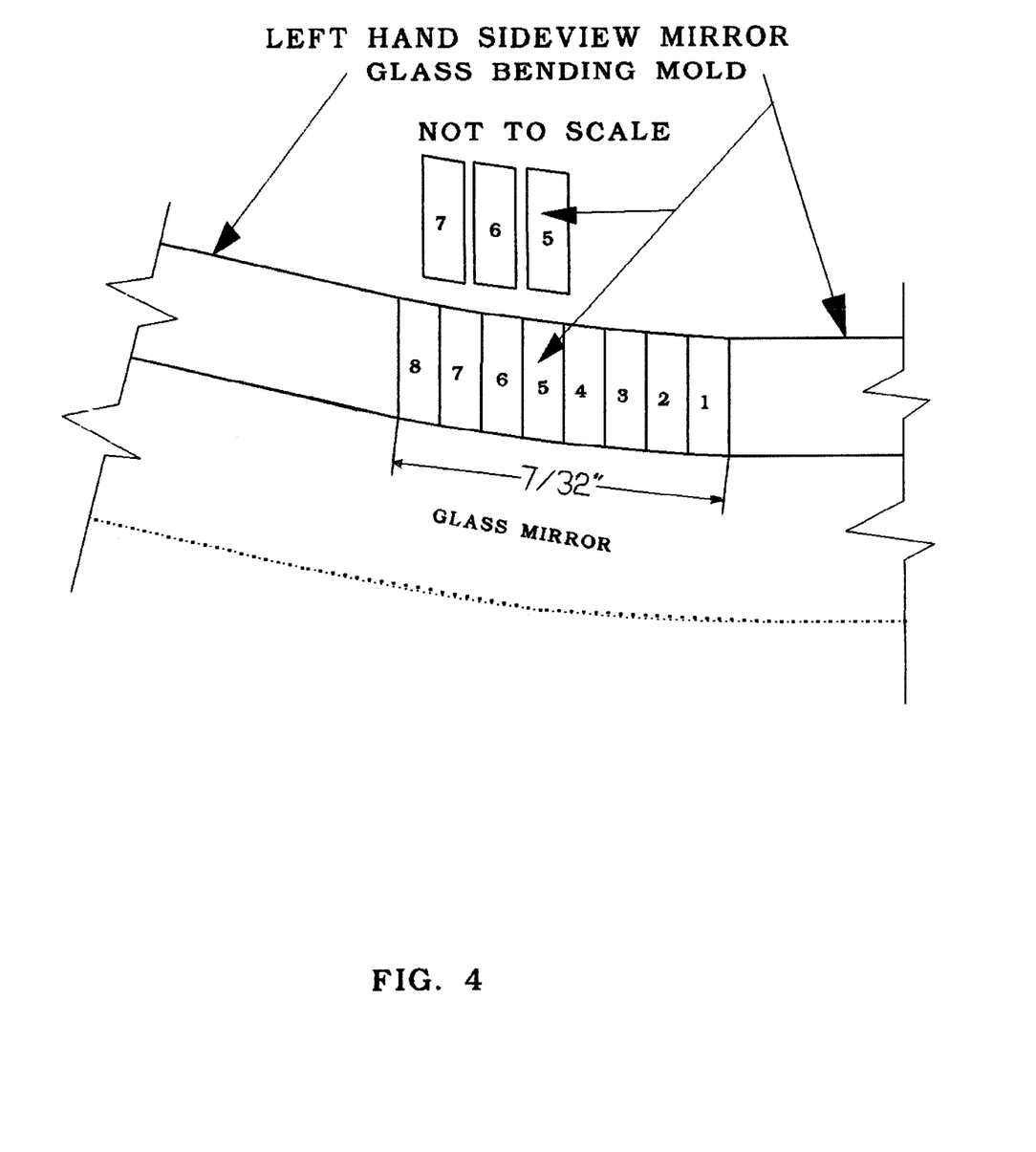
Figure 5:
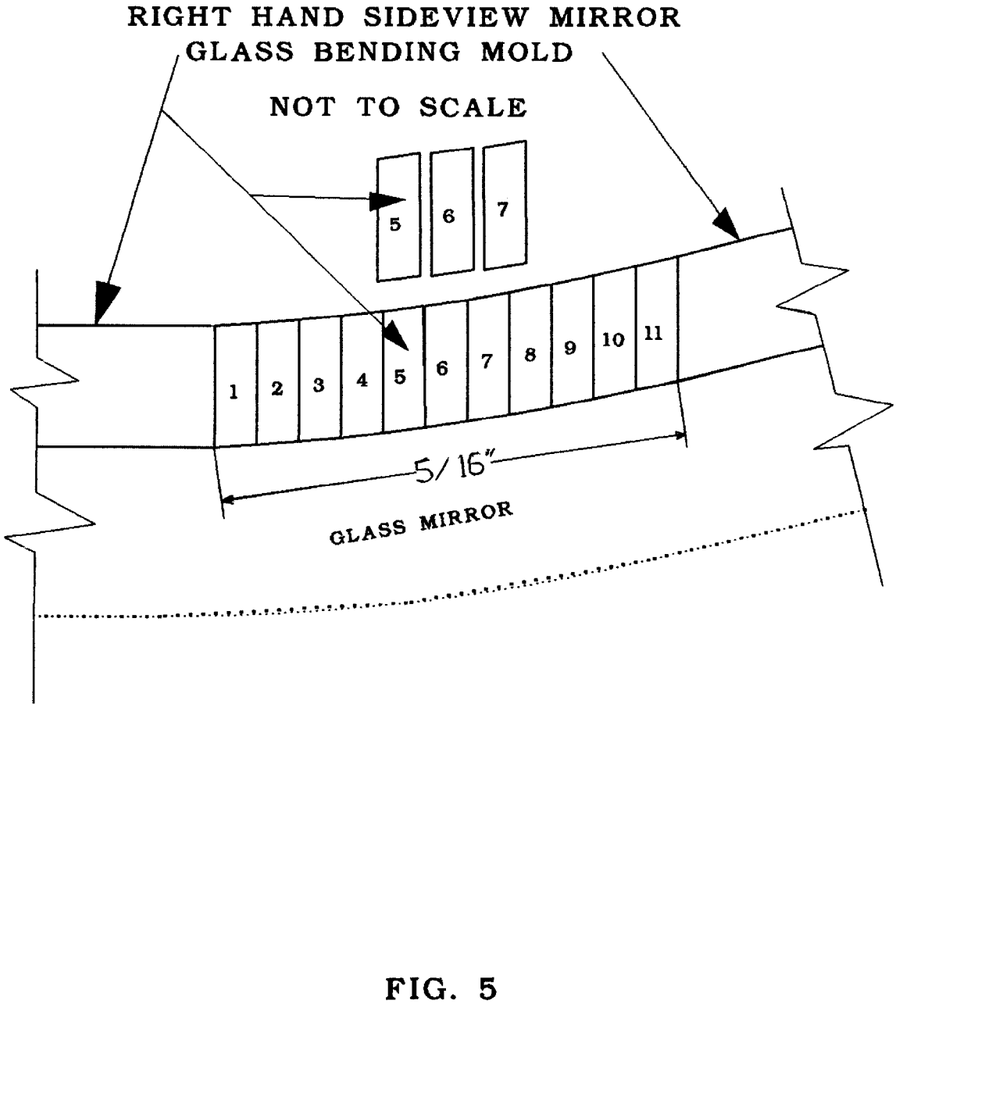
FIG. 5, for the right hand sideview mirror, is a detail of the transition bending plates that will be used in the glass mold to produce the narrow flat plane bending planes transition from mirror plane E to mirror plane F. The total transition is from 2.4 degrees to 14.5 degrees for the right hand sideview mirror. The span of the transition plates should remain approximately 5/16".
Figure 6A:
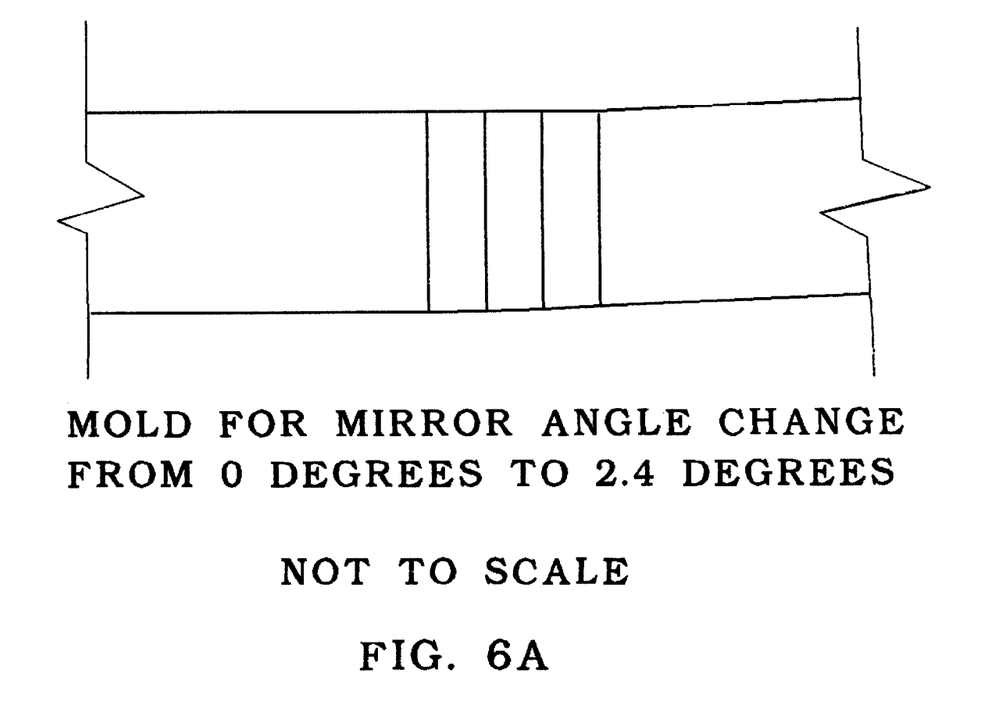
FIG. 6A, for the right hand sideview mirror, is a detail of the transition bending plates that will be used in the glass mold to produce the narrow flat plane transition from mirror plane D to mirror plane E. The total transition is from 0 degrees to 2.4 degrees for the right hand sideview mirror. The span of the transition plates should remain approximately ⅛".
Figure 6B:
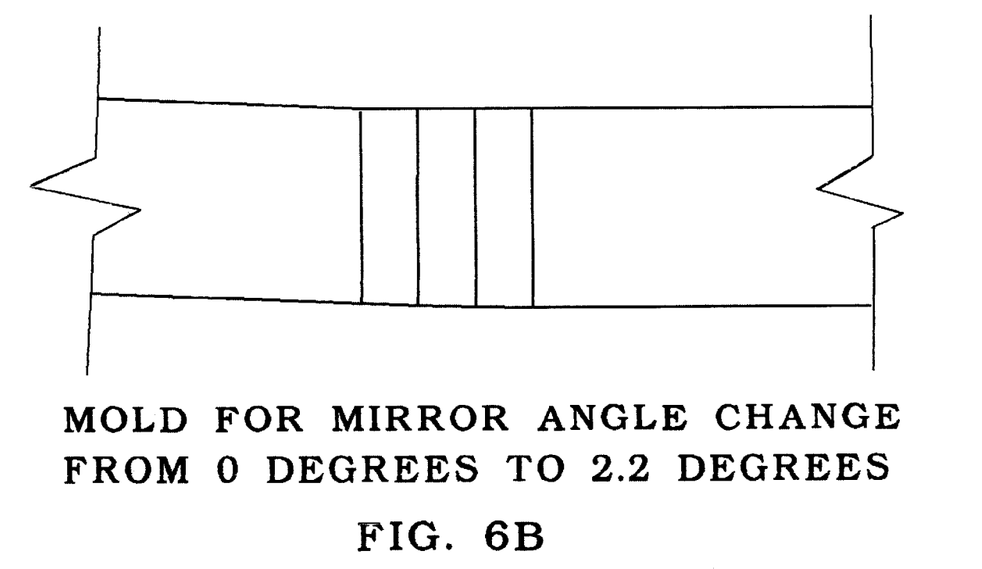
FIG. 6B, for the left hand sideview mirror, is a detail of the transition bending plates that will be used in the glass mold to produce the narrow flat plane transition from mirror plane A to mirror plane B. The total transition is from 0 degrees to 2.2 degrees for the left hand sideview mirror. The span of the transition plates should remain approximately 3.75/32".

FIG. 2B and FIG. 3B shows the height of the mirrors for automobiles and how the left hand mirror and right hand mirror would look after they are mounted and secured in a container. All three mirror sections would be formed in a mold using the bending plates in FIGS. 4, 5, 6A, and 6B plus the details in FIGS. 2A, 2B, 3A, and 3b to form the shape of the mold.

FIGS. 4, 5, 6A, and 6B shows the method which will shape the glass making a transition from one plane to the other with a series of narrow flat plane sections of the mirror instead of the basic method of three flat plane sections being molded together. The width and degree of change for each narrow section will be determined so that the view gap caused by the degree change will be so tiny that the naked eye will not notice the gap thus providing a natural view of each adjacent plane without distortion. The bent mirror will then be attached to a stable base. The glass in Sections B, C, E, and F may have a slight reddish tint including the narrow transition plane sections for the purpose of notifying the driver that any vehicles in either of these sections means "danger do not switch to their lane". The increased size appearance and location in the mirror will also notify the driver that the vehicles in B and C or E and F are in the danger zone so the driver will not attempt a lane change.

Figure 7:
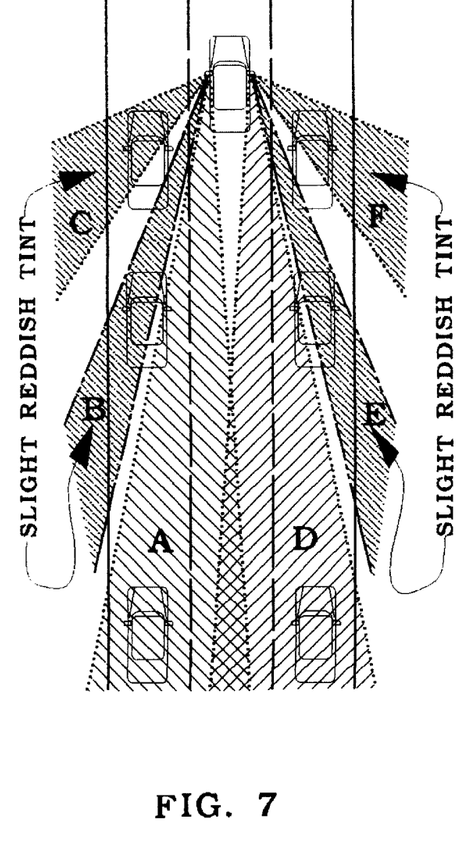
FIG. 7, is the view area for the mirrors on each side of a vehicle, without the narrow flat plane transition mirror sections, which shows the approximate viewing area of each large section of the sideview mirrors, the actual viewing area would vary depending on the closeness and the position of the driver's head while driving or while viewing the mirrors, also shows the location of the mirrors on the vehicle from front to rear which is the standard location for sideview mirrors.

FIG. 7 shows the viewing area, without the narrow flat transition bending planes sections, which will vary slightly for each driver due to the driver's distance from the mirror and the position of the driver's head crosswise the vehicle. Mirror Sections A and D will show vehicles 100 feet or more behind the driver's vehicle. Mirror Sections B and E will show the road and shoulder or a vehicle which is just behind the blind spot area and will show a vehicle that is overtaking the driver's vehicle which is about to enter the blind spot area. Mirror Sections C and F will show rapidly passing landscape until a vehicle moves into the blind spot area. The vehicle in the blind spot section will eliminate most if not all of the moving landscape and will make a dramatic change in the display in the C or F mirror section. The difference in the cross hatching shows the area displayed in the mirror with a slight reddish tint. It also shows how the sideview mirrors will be positioned on the vehicles from front to rear of the vehicles.

Figure 8:
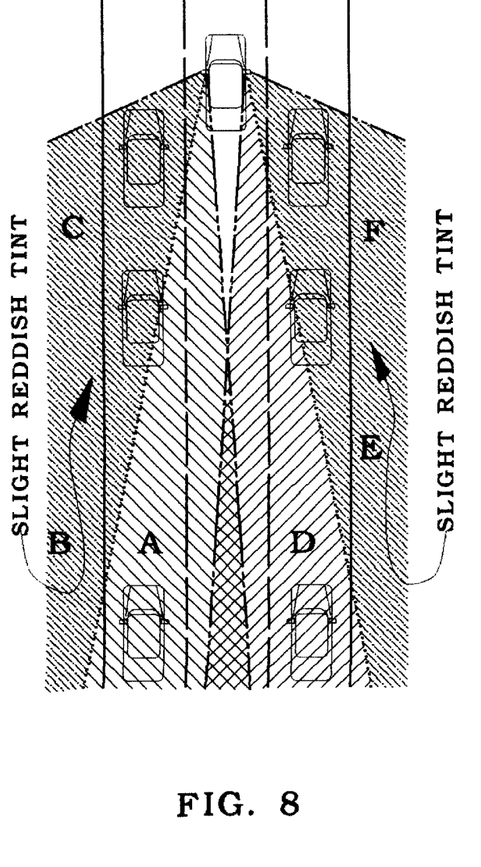
FIG. 8, is the view area displayed using this transition bending method invention. There will not be any distortion and the view gaps will be so tiny they will not be noticeable to the naked eye similar to viewing movie pictures.

FIG. 8 shows the same viewing area as FIG. 7 plus the small gaps are filled in with the series of very narrow flat plane sections so that when looking at the mirror, the image will appear as one continuous image without any noticeable gaps nor distortion. The difference in the cross hatching shows the area displayed in the mirror that may have a reddish tint.

The height of the auto mirrors will be approximately four and one half inches (4½"), except that truck mirrors may be as high as 16". Mirror sections A and D will be three and one half inches wide (3½"). Mirror sections B and E will be one and one half inches wide (1½"). Mirror sections C and F will be two and one half inches wide (2½"). All sections may be made wider or taller if regulation modifications permit. All sections will be made completely of a flat plane mirror surface without any curves. The base will be made with non-swelling and non-shrinking material with three different planes with the angles as shown on FIG. 2A and FIG. 3A. It must be noted that the right hand mirror will have different viewing angles from the left hand mirror. The mirrors will be attached to the base with water proof resilient adhesive to avoid the possibility of cracking the mirrors in extreme weather conditions.

The housing containers which will fasten the mirror assembly to the vehicles will be the same units now being used or produced by the manufacturer with minor adjustments.

I claim:

1. An exterior rearview mirror assembly of an automobile comprising:

a left sideview mirror and a right sideview mirror mounted on front portion of said automobile with a support member;

said left sideview mirror consisting of first, second, and third flat plane reflective portions for displaying regular rearview area, over taking area and blind spot area respectively, said first portion positioned nearest to driver of the automobile with 0 degree inclination, said second portion positioned between the first and the third portion with 2.2 degree inclination with respect to the first portion, and said third portion positioned furthermost to driver of the automobile with 10.5 degree inclination with respect to the first portion;

said right side view mirror consisting of first, second, and third flat plane reflective portions for displaying regular rearview area, over taking area and blind spot area respectively, said first portion positioned nearest to driver of the automobile with 0 degree inclination, said second portion positioned between the first and third portion with 2.4 degree inclination with respect to the first portion, and said third portion positioned furthermost to driver of the automobile with 14.5 degree inclination with respect to the first portion;

a first narrow reflective transition section positioned between said first and second flat portions of one of said left sideview mirror and said rightside view mirror, said first transition section graduating from said first flat portion to the second flat portion with a gradual change by ½ degree to 1 degree until said second flat portion;

a second narrow reflective transition section positioned between said second and third flat portions of one of said left sideview mirror and said right sideview mirror, said second transition section graduating from said second flat portion to said third flat portion with a gradual change by ½ degree to 1 degree until said third portion;

wherein said side view mirrors provide almost invisible vision gaps between said transition sections and flat portions.

* * * * *